United States Patent Office.

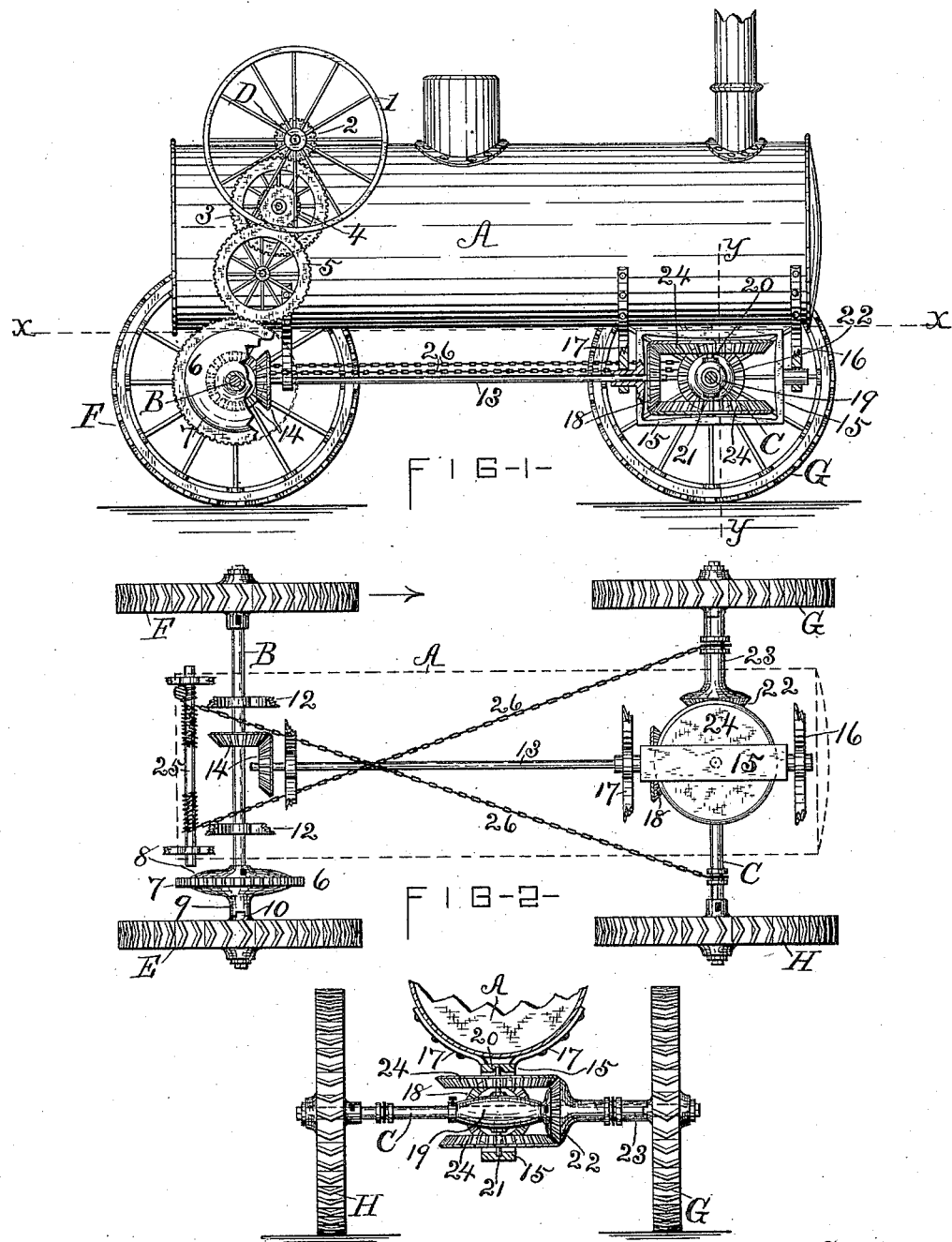

MARCUS W. PETERS, OF LAFAYETTE, NEW YORK.

TRACTION-ENGINE.

SPECIFICATION forming part of Letters Patent No. 363,415, dated May 24, 1887.

Application filed September 22, 1886. Serial No. 214,244. (No model.)

*To all whom it may concern:*

Be it known that I, MARCUS W. PETERS, of Lafayette, county of Onondaga, in the State of New York, a citizen of the United States, have invented certain new and useful Improvements in Traction-Engines, of which the following is a specification, reference being had to the accompanying drawings, in which—

Figure 1 is a side elevation with side traction-wheels removed; Fig. 2, a sectional view taken on line *x x*, Fig. 1; and Fig. 3, a section taken on line *y y*, Fig. 1.

Similar letters and figures of reference indicate corresponding parts throughout the several views.

This invention relates to traction engines in which the propelling-power is transmitted from the rear axle to the front one, and I intend by it to simplify the construction of the power generating and transmitting mechanism, and also the fifth-wheel construction; and my invention relates more especially to these points.

It is constructed as follows: A represents an ordinary "Cornish" boiler. B is the rear axle. C is the front axle. D is the driving-shaft provided with the fly-wheel 1 and pinion 2. This pinion 2 meshes with the gear 3, which is provided with the pinion 4, which meshes with the gear 5, and this gear meshes with the differential gear 6. These several gears and pinions form a train of gears to transmit the power to the axle, and they are mounted upon the boiler, in substantially a vertical line, in any ordinary manner. This differential gear consists of two parts—a central geared pulley, 7, fitting loosely upon the axle B, a flange, 8, provided with teeth or studs which engage with the body of the pulley 7, in any ordinary manner, and this flange is securely keyed to the axle.

E, F, G, and H are the wheels, of which I show two, F and H, secured to their respective axles, the others being loose. Between the gear 6 and the wheel E, I place a flanged sleeve, 9, and provide the outer end thereof with a clutch, 10, which engages with a like construction upon the inner end of the hub of the wheel. This sleeve is loose upon the axle, and the flange may engage differentially with the pulley 7, or not, as may be desired. If it does not so engage, then the inner face of this flange is smooth.

The axle B is mounted in the hangers 12, upon the under side of the boiler. Centrally under the boiler I suspend, in suitable hangers, the transmitting-shaft 13, and this shaft is rotated by the bevel-gears 14, one of which is secured upon the axle and the other upon the shaft. Upon this shaft, and under the front end of the boiler, I mount one side of the rectangular yoke 15, the shaft fitting loosely through a hub upon that end bar of the yoke, while the other hub upon the other end of the frame is mounted in the hanger 16, secured to the boiler, while the rear hub is mounted in a like hanger, 17, both loosely. Upon this shaft, and within the rear end of the yoke, I secure the beveled pinion 18.

Upon the axle C, I place the loose sleeve 19, provided with trunnions 20 21, upon opposite sides, and hold one end thereof in place by a collar and set-screw, as shown. The other end of the sleeve abuts against the differential gear 22, which is like 6, except that the loose pulley is beveled on its gear-face. Between this gear 22 and the wheel G, I place a flanged sleeve, 23, constructed like the sleeve 9, and connected to the hub of this wheel by a clutch-joint.

The ends of the trunnions 20 21 are mounted, respectively, in the upper and lower bars of the yoke 15 and the sleeve 19, and its trunnions so mounted form and constitute the king-bolt. Upon these trunnions 20 21, and within the yoke, I mount loosely the bevel-gears 24, which mesh with the pinion 18 and the differential gear 22, and these gears and pinion with this differential gear constitute the mechanism to rotate the axle C, and they also, in combination with the king-bolt, constitute the fifth-wheel mechanism.

Beneath the rear end of the boiler I suspend my steering mechanism, consisting of a shaft, 25, rotated by a worm-gear, and chains 26, reversely coiled or wound upon the shaft, and as to their front ends loosely connected to the front axle by rings around the axle, which rings are prevented from slipping by suitable collars.

It will be observed that my king-bolt mechanism permits the front wheels and axle to be easily operated in turning curves, the trunnions acting as the pivots; also, that the yoke being suspended longitudinally in loose bearings it (the yoke) can oscillate with the axle, and thus overcome all inequalites and depressions in the roadway without disturbing the equilibrium of the front end of the boiler, and that this yoke-oscillation permits of the rocking of the rear end of the boiler without affecting the front axle and wheels.

What I claim as my invention, and desire to secure by Letters Patent, is—

1. In a traction-engine, the driving or propelling mechanism, consisting in the combination of a drive-shaft, a train of gears and pinions, a differential gear upon the rear axle, a bevel-gear keyed to said rear axle, and a transmitting-shaft provided with beveled pinions upon its opposite ends, one of said pinions meshing with said bevel-wheel on the rear axle and the other meshing with two bevel-gears operating within a yoke suspended beneath the boiler, said two bevel-gears meshing with a bevel-wheel keyed to the front axle, all arranged to operate substantially as set forth.

2. In a traction engine, the combination of the bevel-gears 14, situated as described, the transmitting-shaft, the beveled pinion 18, and the bevel-gears 24, meshing with a bevel-wheel keyed to the front axle, all arranged to operate for the purpose substantially as described.

3. In a traction-engine, a transmitting shaft suspended horizontally beneath the center of the boiler and provided with beveled pinions upon its opposite ends, one of said pinions meshing with a bevel-wheel keyed to the rear axle and the other meshing with two bevel-gears operating horizontally above and below the front axle, substantially as set forth.

4. A king-bolt mechanism consisting in the combination of a rectangular yoke suspended beneath the boiler by suitable hangers and supporting the front axle, and a sleeve loosely mounted upon said axle and provided with trunnions which have their bearings in said yoke above and below the longitudinal center of the axle, said trunnions having gears loosely mounted upon them, substantially as described.

5. A fifth-wheel mechanism consisting in the combination of a stationary rectangular yoke suspended so as to encircle the front axle, a sleeve loosely mounted upon said axle, provided with vertical trunnions having their bearings in the yoke, gears loosely mounted upon said trunnions and operating horizontally within the yoke, a pinion upon the end of a transmitting-shaft, and a bevel gear-wheel keyed on the front axle, all arranged to operate substantially as set forth.

6. In a traction-engine, the front-axle-rotating mechanism, consisting in the combination of a rectangular yoke suspended beneath the longitudinal center of the boiler and encircling the front axle, gears horizontally mounted within the yoke above and below the axle, an upright bevel-wheel keyed upon the axle and meshing with said bevel-gears, and a beveled pinion mounted upon a transmitting-shaft, and also meshing with said bevel-gears, all arranged to operate substantially as described.

7. In a traction-engine, the yoke 15, the hangers 16 17, the bevel-wheel 22, the bevel-gears 24, and the beveled pinion 18, in combination with the transmitting-shaft suspended horizontally below the boiler, substantially as described.

In witness whereof I have hereunto set my hand this 11th day of September, 1886.

MARCUS W. PETERS.

In presence of—
 MINNIE E. PETERS,
 F. W. BARKER.